Sept. 27, 1932. J. J. SMITH 1,879,565
PRESSURE COUPLING
Filed Jan. 23, 1931
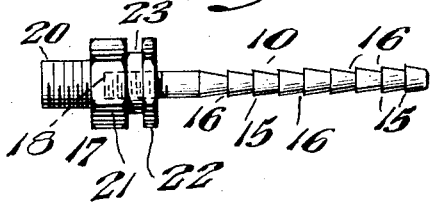
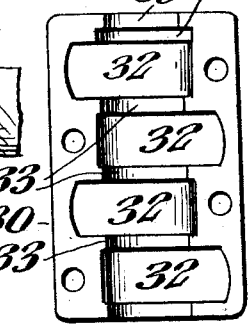
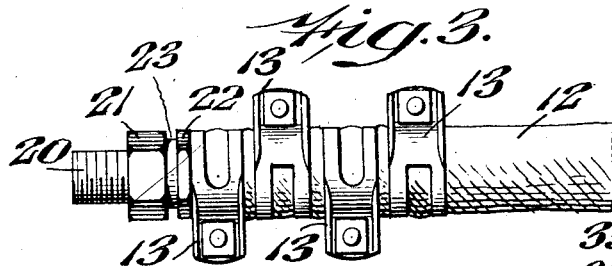
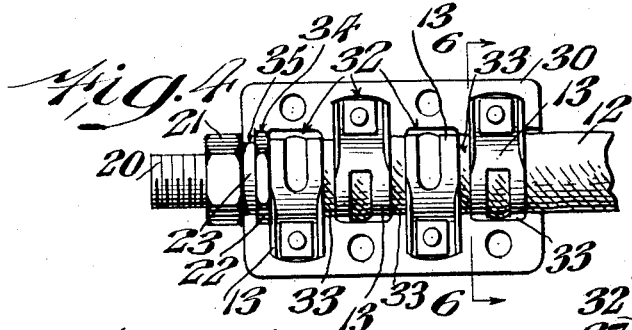
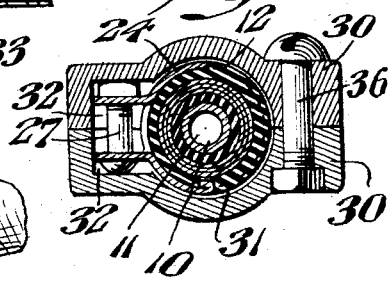
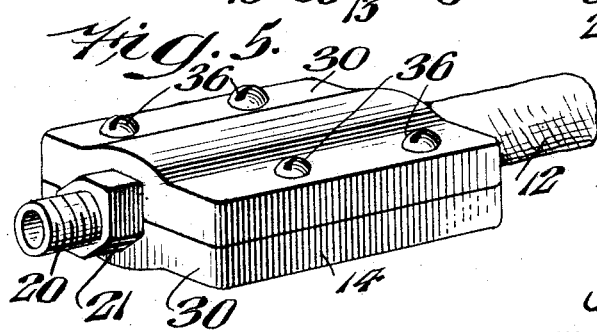
INVENTOR:
James J. Smith,
BY Robert M. Barr.
ATTORNEY Patented Sept. 27, 1932

1,879,565

UNITED STATES PATENT OFFICE

JAMES J. SMITH, OF PHILADELPHIA, PENNSYLVANIA

PRESSURE COUPLING

Application filed January 23, 1931. Serial No. 510,717.

The present invention relates to hose couplings and more particularly to couplings for use on high pressure lines such for example as carry grease or semi-solid products under pressure.

In the handling of present day lubricants, particularly of the semi-solid kind, distributing and feeding pressures have been increased so tremendously that the lubricant carrying equipment in many parts has failed to stand up under the strains imposed. Among such parts are the couplings whereby two sections of hose or a section of hose and a distributing line are removably connected together. This trouble is manifested by the coupling parts easily developing leaks, by the blowing off of a part, or distortion preventing leak proof alinement of parts.

Some of the objects of the present invention are to provide an improved coupling for flexible hose and the like; to provide a coupling capable of withstanding all operating pressures to which it is subjected in use; to provide a coupling part which can be so connected and joined to the end of a hose as to resist all pressures tending to force such coupling axially of and relatively to the hose; to provide an end coupling for hose which can be quickly and readily connected to another part to form a unitary supply line for material; and to provide other improvements as will hereinafter appear.

In the accompanying drawing Fig. 1 represents a side elevation of one form of coupling insert forming a part of the present invention; Fig. 2 represents a plan of one of the clamp parts; Fig. 3 represents a plan of the insert and clamps as assembled on a hose; Fig. 4 represents the same as operating located in one half of the anchoring casing; Fig. 5 represents a perspective of the completely assembled coupling; Fig. 6 represents a section on line 6—6 of Fig. 4; and Fig. 7 represents a face elevation of one of the casing members.

Referring to the drawing a form of the invention here shown by way of example consists of an insert 10 to enter and be held in the bore 11 of a hose 12, a plurality of clamps 13, and an anchoring casing 14.

The insert 10 is preferably in the form of a tubular metal stem of substantially the same diameter as the hose bore 11 so that it can be forced thereinto and held against withdrawal by teeth 15 which are so arranged as to bite into the fabric of the hose whenever a withdrawal pressure or force is applied. These teeth 15 are respectively formed by circumferential grooves 16 cut transversely along the length of the stem while between adjacent grooves 16 the stem has a tapered effect which aides in the initial insertion of the stem. These grooves 16 also serve to receive the material of the hose 12 as it is compressed by the action of the clamping means. As here shown the outer end of the insert 10 is attached to the coupling part 17 by a threaded shank 18 though this construction may be varied without departing from the invention. The coupling part 17 may be either a male or a female member though preferably it is the former consisting of an exteriorly threaded connector 20 and a body having two flanges 21 and 22 which form a circumferential slot 23 for a purpose to be presently described. The periphery of the flange 21 is preferably polygonal in shape in order that it can be held by a wrench when necessary and the flange 22 is of like configuration for a purpose to be described.

The clamps 13, of which there are four used in the preferred form of the invention, each consist of a metal strip 24 bent to form a split ring and having its two meeting ends 25 and 26 turned outwardly to lie in two substantially parallel planes. These ends are suitably apertured to receive a clamping bolt 27 which draws the ends together during assembly to cause the strip 24 to compress the hose 12 about the insert 10 and thus cause the desired interlock between the parts. As here shown the four clamps 13 are spaced apart in order that there may be four distinct bonds about the insert, while axially considered they are arranged in alternately staggered relation.

For anchoring the above described parts a two piece casing 30 is provided, the parts of which are complemental and arranged to seat one on the other in flush relation. Axially cut in each part is a groove 31 which is semi-circular in section and of a radius to fit snugly about the outer face of the hose 12. Communicating with this groove 31 are a plurality of pockets 32 corresponding in number to the clamps 24 and in which the respective clamps seat so that each bears against a wall transverse to the axis of the groove to enable the clamps to resist axial movement relative to the hose. When the two casing parts are assembled to form the necessary anchoring unit each clamp lies in an encircling pocket 32 with its side edges bearing against the wall of such pocket. This pocket wall 33 is formed by the metal left upstanding between each pair of pockets and when the two parts 30 of the casing 14 are placed face to face the opposed walls meet to provide a complete circumferential wall. At the end of the casing 14 from which the discharge connector 18 leaves a transverse slot 34 is cut in each casing section at the proper axial position to seat the flange 22 so that in assembled condition the latter has a thrust bearing against the end wall 35 of the casing 14. The shape of the slot 34 is such as to conform to the shape of the flange 22 and is of a size to accurately seat the flange 22 so that the latter is held against turning movement. This is important because it allows the cooperating part to be attached without placing any torque strain upon the hose proper. The two parts of the casing 14 are rigidly clamped together by bolts 36, screws, or any other suitable fastening means.

It will now be apparent that a complete coupling part has been devised wherein each part thereof contributes in one way or another to the total force resisting or acting counter to the expelling force upon the lubricant or other material. Thus while the plurality of hose clamps act to bind the hose to the insert each abuts a fixed wall of the casing to resist endwise thrust. Also the insert 10 is provided with the teeth 15 which are forced into the hose by the clamping action of the hose clamps and hence resist relative movement between the insert and the hose. Furthermore a supplemental thrust resisting action is provided through the interfitting of the flange 22 and slot 34 when the two casing parts are closed together and interlocked.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A coupling part for the end of a hose comprising a tubular insert to enter the bore of a hose, a coupling member on said insert, clamps about the exterior of said hose for clamping said hose to said insert and arranged in spaced relation along said hose, a casing about said hose having thrust walls for engagement respectively by said clamps, and means to anchor said casing in operative position.

2. A coupling part for the end of a hose comprising a tubular insert to enter the bore of a hose, a coupling member on said insert, clamps about the exterior of said hose for clamping said hose to said insert and arranged in spaced relation along said hose, a casing about said hose, means between said insert and said casing to prevent relative movement therebetween, and means to anchor said casing to said hose.

3. A coupling part for the end of a hose comprising a tubular insert to enter the bore of a hose, a coupling member on said insert, clamps about the exterior of said hose for clamping said hose to said insert and arranged in spaced relation along said hose, a casing about said hose, means in said casing to prevent movement of said insert relative to said hose, means also in said casing to prevent relative movement between said clamps and hose, and means to anchor said casing to said hose.

4. A coupling part for the end of a hose comprising a casing having a hose receiving bore, an inner circumferential slot, and a plurality of pockets, a tubular insert to enter the bore of said hose having a flange to seat in said slot to resist end thrust, a coupling member on said insert, hose clamps about said hose and seating respectively in said pockets, and means to anchor said casing to said hose.

5. A coupling part for the end of a hose comprising a casing having a hose receiving bore, and an inner circumferential polygonal shaped transverse slot, a tubular insert to enter the bore of said hose having a polygonal shaped flange to seat in said slot to resist end thrust and all turning movement, a coupling member on said insert, means to clamp said hose to said insert, and means to anchor said casing to said hose.

Signed at Philadelphia, county of Philadelphia, State of Pennsylvania, this 22 day of January, 1931.

JAMES J. SMITH.